Oct. 8, 1935. H. H. LURIE 2,016,866
WELDING APPARATUS
Filed Feb. 25, 1932 2 Sheets-Sheet 1
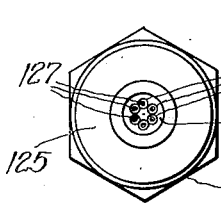
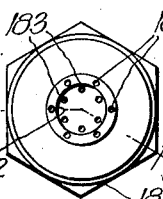
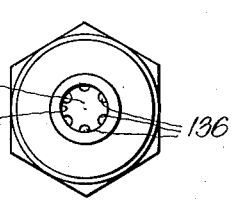
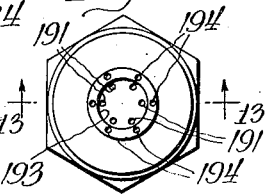
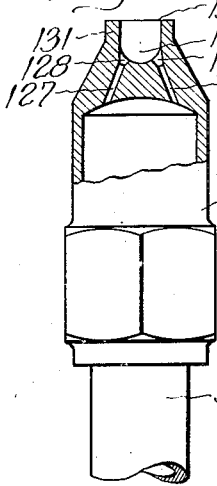
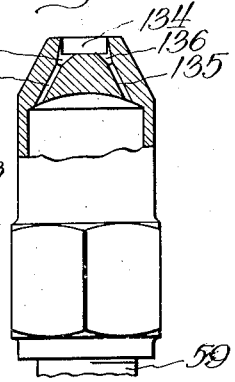
Inventor:
Harold H. Lurie.
By Brown Jackson Boettcher Dienner
Attys.

Oct. 8, 1935.    H. H. LURIE    2,016,866
WELDING APPARATUS
Filed Feb. 25, 1932    2 Sheets-Sheet 2
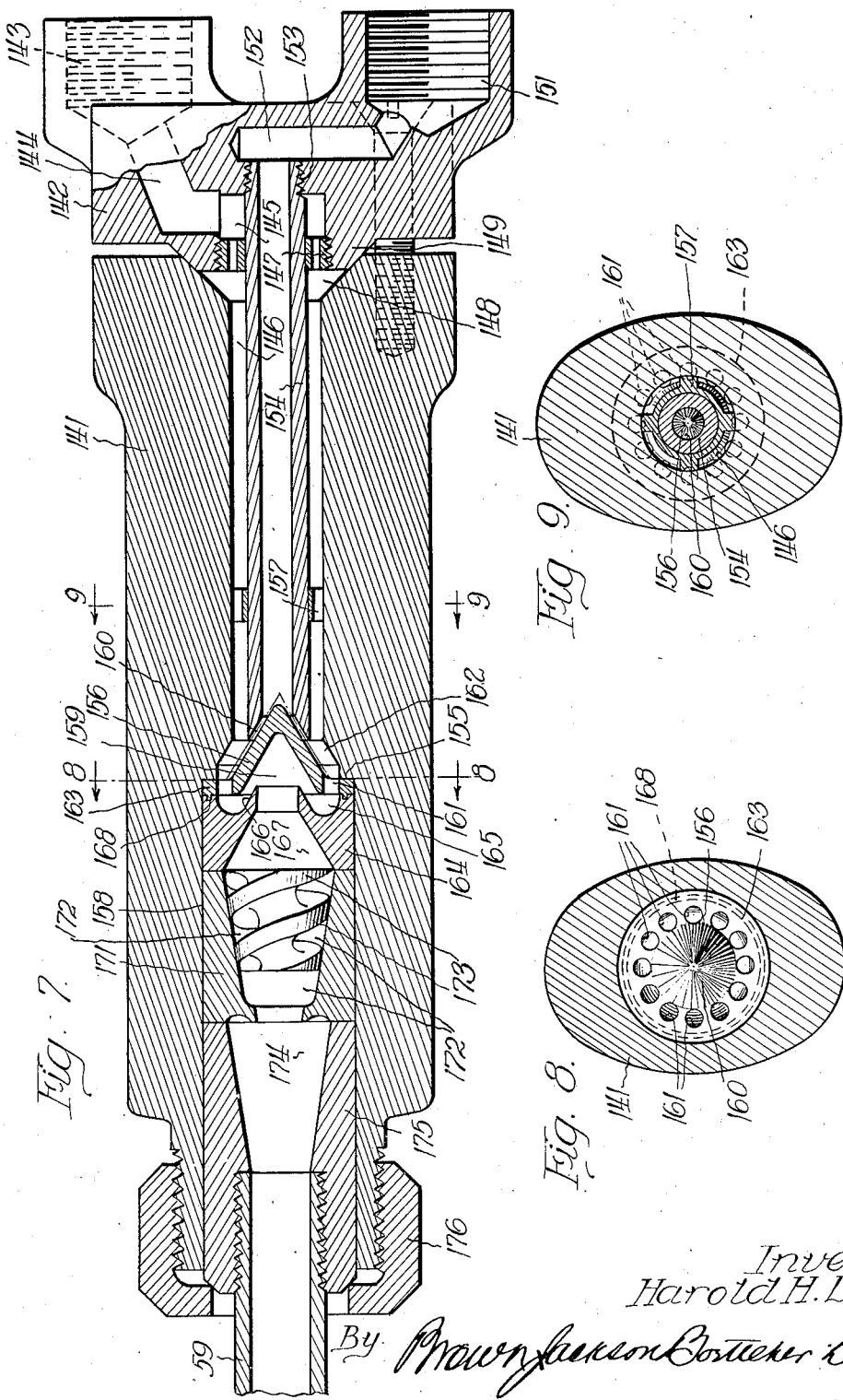
Inventor
Harold H. Lurie.
By Brown Jackson Boettcher Dienner
Attys Patented Oct. 8, 1935

2,016,866

UNITED STATES PATENT OFFICE 2,016,866

WELDING APPARATUS

Harold H. Lurie, La Fayette, Ind., assignor, by mesne assignments, to Utilities Research Commission, Inc., Chicago, Ill., a corporation of Illinois Application February 25, 1932, Serial No. 595,015

2 Claims. (Cl. 158—27.4)

The present invention relates generally to the art and process of welding or cutting metals and the like by the application of intense heat which is usually obtained by the controlled combustion of one or more gases. This manner of fusing and uniting metal is commonly termed gas or flame welding.

The principal object of the present invention is the provision of an improved process of welding and means for practicing the same, whereby, in the process of gas welding, a gas, or gases of relatively low calorific value, such as ordinary commercial or illuminating gas or the like, may be economically and effectively employed.

Another object of the invention is the provision of a method whereby in gas or flame welding employing gas mixtures of low flame velocity an intimate mixture of the combustible and oxygen is supplied to the flame to produce a practical maximum combustion velocity, thereby releasing more heat than has heretofore been realized.

Still another object is the provision of a method of and means for preventing oxidation of the work in flame welding, particularly where gases of low calorific value are employed, and where the gas must be almost completely burned to develop a welding temperature.

Means have long been sought whereby commercial or ordinary illuminating gases in combination with oxygen could be used for autogenous welding. Commercial or ordinary city gas is almost universally available and is relatively inexpensive. Furthermore, no extra equipment such as drums, generators, tanks or the like are required for its use, as is the case in the use of other combustibles. Up to the present time, however, efforts to employ illuminating gas in a practical form have not been greatly successful.

A large portion of the welding done at the present time is in connection with the production of structural objects such as aeroplane fuselages, the fabrication of metal commodities such as moldings, furniture, and the like, and other work where wrought iron and steel are employed. In order to be successful, illuminating gas welding must be practical with these metals. These metals have a relatively high melting point and a high heat conductivity factor, which necessitates the use of high flame temperatures to permit fast welding, thereby to prevent excessive heating of the adjacent metal. Furthermore, under these conditions, iron and steel are subject to rapid oxidation and carbonization, both of which interfere with the welding operation and cause deterioration of the welded and adjacent metal by producing objectionable changes in its structure and composition.

In autogenous welding or cutting it is essential to have a concentrated flame producing a zone of intensely high temperature. At the same time it is necessary to prevent the metals, or the portions thereof subjected to the intense heat, from being oxidized, particularly when iron or steel are being welded, because these metals, when at high temperature, have a great affinity for oxygen or other oxidizing agents.

Where a gas of relatively high heating value, such as acetylene, is employed, enough heat is generated by a partial decomposition to effect the fusion of the metal. The gases resulting from the partial combustion or decomposition are principally carbon monoxide and hydrogen, and these combustion products coming in contact with the work protect it from atmospheric oxidation.

Other gases of high calorific value may develop sufficient heat by a total combustion of a part of the gas mixture and a partial combustion of the remaining portion of the mixture, thus leaving enough of the unburned combustible, or its partially oxidized combustion products, to afford ample protection to the weld against deterioration from oxidation by atmospheric agencies. Furthermore, since the oxyacetylene flame develops more heat than is usually required in its welding applications, the matter of imperfect mixing is not of vital importance, as the loss of a portion of the available heat will not greatly affect the welding operation. In mixtures of oxygen and city gas, the thermal potential is not so great as in mixtures of oxygen and combustibles of higher calorific value, and therefore practically all available heat must be realized from the combustion process.

Commercial or illuminating gas is a partially oxidized gas of low heating value which enters into combination with air or oxygen rather slowly. For this reason, commercial gas and similar fuels must be thoroughly and intimately mixed with oxygen if the burning is to take place with sufficient rapidity to prevent the oxygen from reaching the molten weld metal.

In my prior Patent No. 1,970,012, issued August 14, 1934, I have disclosed a welding torch providing means for thoroughly mixing two or more gases in order to obtain a rapid chemical reaction between them when burned in the welding flame. The present application concerns a process of welding and a means for effecting the same, whereby the entrainment of air into the welding flame is prevented and a neutral or reducing atmosphere is presented to the work to protect it from oxidation by the air. While the present invention is admirably suited to welding with commercial or other gases of low calorific value in combination with oxygen, it is also capable of a much broader application. For example, it may be employed in welding processes in which acetylene is used, or in any process using a combination of gases which does not inherently provide a protection of the work against contact with deteriorating agents in the atmosphere.

The present invention overcomes the above described difficulties by providing a flame which comprises a plurality of zones having separate and distinct characters, these zones being so situated with respect to each other that they may cooperate to permit a rapid and efficient performance of the welding operation and at the same time protect the metal from deterioration when employing a gas mixture of low calorific value and having a moderate or low rate of flame propagation.

According to one method of carrying out the present invention, I introduce into the welding zone, at a high velocity, a mixture of combustible and combustion supporting gases of such character as will produce a high temperature flame that is neutral to the metal which is being welded. I also introduce, surrounding this central welding zone, a low velocity sheath of combustible gas which may or may not be mixed with oxygen or air. This sheath or blanket surrounding the welding zone prevents the entrainment of any air from the atmosphere into the welding zone. Since this outer protecting mantle moves at a low velocity it entrains very little air itself, and so remains practically free from oxidation or adulteration by the air. However, any slight amount of atmospheric oxygen that may be entrained will enter into combination with, and complete the combustion of, the slow moving outer envelope of gas. By thus consuming the entrained oxygen in the outer envelope of gas, I prevent it from reaching the welding zone and thereby insure a neutral atmosphere next to the metal for its protection.

The gas or gas mixture for the protecting mantle may be supplied to the tip of the welding torch, through a separate or auxiliary conduit, and any admixture of air or oxygen into this gas may be regulated independently from the regulation of the mixture for the central welding zone of the flame. It is not necessary, or in some cases it may not even be desirable, that this auxiliary gas be the same, or even a gas similar to that used to effect the welding of the metal, but where it is possible the use of the same combustible makes for simplicity and economy.

On the other hand, a single gas mixture may be conducted to the welding tip and there segregated into a central high velocity stream for the production of the welding temperature and a low velocity slow burning stream or mantle surrounding the high velocity stream for the protection of the metal against the atmosphere. Under many conditions this is the preferred manner of carrying out my invention.

This segregation of the gas mixture into two distinct stream portions may be accomplished in many different ways, as for example, by providing an annular orifice or a series of orifices from which the mixture may issue at a low velocity, surrounding one or more central orifices from which the gas mixture issues at high velocity.

It may also be effected by emitting the gas from a single port and disrupting or impeding the outer portions of the stream, so that these outer stream portions issue as a slow moving mantle surrounding the relatively high velocity central portion of the stream.

The disrupting or retarding of the outer stream portions is best accomplished by inducing a turbulent flow therein. To this end I provide a slight enlargement, such as a flared portion, at the orifice of the welding tip or nozzle, which will induce in the surface of the gas stream pressure oscillations, eddy currents, or other parasitic disturbances which, because of the viscosity of the gas and of the friction exhibited between the gas and the walls of the passage, saps the gas of its mechanical energy of flow, thereby retarding its motion. I may also provide a slight constriction of the passageway at the nozzle, thereby providing a direct obstruction to the flow of the outer layers of the gas stream in addition to the turbulent action incident to the flow of the gas around the obstruction.

It is known that gas flowing through a series of conduits increases its velocity in passing through a constricted duct. It is also known that, in the case of a combustible gas flowing through a pipe or other conduit, other conditions such as pressure, temperature, etc., being equal, the rate of flame propagation within the gas decreases with a decrease in the diameter of the passageway. I therefore include in my welding tip a passageway of such small diameter as will cause the rate of flame propagation to be less than the velocity of the stream flowing therethrough, so that it will be impossible for the flame to travel upstream into the handle of the torch. This passageway opens into the flared orifice or other enlargement through which the gas is introduced into the flame. In the case of a constricted orifice the passage may open into an enlargement preceding the constrictions, or the constriction may be provided at the outlet of this small channel itself. In this connection a nozzle construction with a flared or otherwise enlarged orifice in accordance with the teachings of my invention presents another advantage over devices heretofore used. Welding tips heretofore known have usually had a uniform bore, so that some adjustment of the velocity of the stream issuing therefrom has been necessary in order to maintain the flame in its proper place at the welding tip. If the velocity of the gas stream were too low the flame would travel upstream into the torch handle, or if the stream velocity were too great the flame could not travel upstream fast enough to maintain its position at the tip of the welding torch and would be blown off the end thereof. Since this adjustment of gas velocity has been required, users of prior devices have found it necessary to have an assortment of welding tips with various sizes of gas passageways in order to employ the torch with combustible gases having different rates of flame propagation.

A welding torch which employs a tip embodying my present invention shows very little tendency to blow the flame off the tip, since within the enlarged orifice there is provided a region in which the rate of flame propagation through the gas changes rapidly as the flame moves upstream, and in which the stream velocity also changes, due to the change in the diameter of the gas passageway. The flame, therefore, travels upstream into this enlarged orifice until it reaches the point where the rate of flame propagation equals the rate of flow of the gas.

The small diameter channel preceding the enlarged orifice positively prevents flash-back of the flame into the torch handle. A torch employing a welding tip such as is herein described for the carrying out of my invention may, when in operation and proper adjustment, have its tip pressed against a flat surface, so that the flame is squeezed out radially around the tip without causing flash-back of the flame into the torch handle. Since my torch tip will maintain the flame in its proper place as the rate of flame propagation of the gas changes over a wide range, it is not necessary, except for the welding of metals varying greatly in thickness, that the user be equipped with a large number of tips in order to provide different orifices to accommodate different gases, or other various conditions. This is especially advantageous when employing commercial or city gas, since the composition of such gas varies from time to time, and its rate of flame propagation may change considerably during the course of a single welding operation. It is obviously desirable and convenient to have one tip which may be employed at all times, regardless of the composition of the gas being used.

In order to acquaint those skilled in the art with the teachings and practice of my invention, I shall now describe one or more specific embodiments thereof, in connection with the accompanying drawings, which form a part of this specification, and in which:

Figures 1 to 6 illustrate several multiple port welding tips employing the principles herein disclosed;

Figure 7 is a longitudinal section through the body of a torch embodying the principles of the present invention;

Figures 8 and 9 are sectional views, taken along the lines 8—8 and 9—9, respectively, of Figure 7; and Figures 10 to 15 illustrate several different forms of welding tips for carrying out my invention.

Figures 1 to 6 illustrate several other forms of multiple jet tips embodying the principles of my invention and which I have found particularly successful. Figure 1 is an end view of the tip illustrated in section in Figure 2. Referring to Figure 2, the tip comprises a portion 124 which is threaded onto the delivery tube 59 of the torch, and a head portion 125 containing a plurality of passageways 127 through which the gas is introduced into the flame. A hemispherical recess 126 is provided in the end of the tip into which the converging ducts 127 open. Each of the individual ducts 127 is provided with a flared portion 128 into which the gas expands before being introduced into the hemispherical recess 126. Because of the enlarged portion 128, each of the individual jets of gas undergoes a double expansion, first in the enlargement 128, and then in the recess 126. The several jets combine to form one welding flame, the high velocity jets merging to form the central flame, and the slow moving gas forming a mantle around the central flame.

In Figure 3 I have illustrated a jet similar to the one illustrated in Figure 2 but having a deeper recess within which the several jets combine. The tips of Figures 2 and 3 are identical, with the exception that the tip of Figure 3 is provided with a collar 131 for increasing the depth of the recess. I have found that by providing a recess of greater depth, the protecting blanket of slow moving gas is ejected in a more forward direction, so that there is less divergence of the slow moving blanket of gas. I have found that the orifice opening 132 is preferably maintained quite sharp, because this edge aids in the stratification resulting in the two distinct portions of the flame. In operation the flame extends well into the recess 126, so that individual flames are emitted from each of the several passageways 127 and the additional stratification provided by the edge 132 is imposed upon the burning gas. For this reason care must be exercised in the construction of this tip to avoid making the recess too deep. It is, of course, necessary that the hottest, or welding portion of the flame be entirely outside of the recess to avoid fusion of the collar 131 and resultant destruction of the sharp edge 132.

The tip illustrated in Figure 6 is provided with a flat bottom recess 134 into which passageways having enlarged orifices 136 open. This construction is similar to that shown in Figure 2. The flat bottom, and the resultant sharp corners in the recess 134, induce a greater turbulence of the gas than does a hemispherical recess such as 126 in the tip of Figure 12. Because the recess 134 is quite shallow it provides very little directing effect upon the outer portion of the flame, which therefore diverges widely as a result of the direction in which the individual jets are emitted from the ducts 135.

Figures 4 and 5 illustrate still another tip of the converging jet type, for hand welding. This tip is similar to the one shown in Figure 16 in that it has a plurality of passageways 135 having enlarged orifices 136 opening into a flat bottom recess 137. However, the recess 137 is of greater diameter at its bottom than at its top, so as to form a lip 138 which induces considerable stratification in the flame, similar to that produced by the edge 132 in the device of Figure 3. Because of the shallowness of the recess 137 it will not direct the flame in a forward direction as much as will the recess 126 of Figure 3, but this shallowness brings the lip 138 farther upstream in the flame so that there is less danger of it fusing in operation of the torch. For this reason the tip of Figure 15 is admirably adapted for use in applications where the tip of the torch must be brought in close proximity to a flat surface, since in such a case the effect of this flat surface may be to reflect heat back towards the torch and thereby move the flame farther into the recess 137.

Figures 7, 8 and 9 illustrate a torch of a construction which is somewhat more simple than the torch illustrated in my aforesaid prior patent. An elliptical member 141 which, in operation, serves as the handle of the device, is provided with two coaxial central bores 146 and 158 at either end thereof, each of which opens into an intermediate tapered portion 162 substantially at the center. The bore 146 opens at the head end of the body member into a machined tapered recess 148. A ported head member 142 surmounts the body member 1 and is secured thereto by any suitable means. The member 142 is provided with a machined truncated conical portion 149 which fits into the tapered recess 148 of the body member 141 to make a gas tight joint between the two members.

A threaded connection 143 is provided in the head for connection to an oxygen supply and communicates, by means of a duct 144, with a central recess 145 which opens into the interior of the body member 141. A ported baffle plug 147 is threaded into the opening of the recess 145. Another threaded connection 151 is provided for connection to a supply of a combustible gas, and communicates with an interior space 152 which opens through a threaded hole 153 in which a tubular member 154 is inserted. The member 154 passes through a central port in the plug 147, and being threaded tightly into the hole 153, prevents communication between the space 152 and the recess 145. The other end of the tube 154 extends into the space or bore 146 of the body member, and is provided with an apertured spacing member 157 to accurately position it centrally therein.

Located within the bore 158 of the body member 141, and seated against a shoulder 155 formed by the meeting of the bores 146 and 158, is a thimble 156 having a central conical section extending into the space 146 and into the open end of the tube 154. The end of the tube 154 is formed to lie substantially parallel to the conical surface of the member 156, and is spaced with respect thereto to provide a narrow passageway 160 leading from the interior of the tube 154 out into the region 162 surrounding the conical member 156. The flange or web 163 of the conical member is provided with a series of holes 161 to permit communication between the spaces 146 and 158 in the body member 141.

The bore or space 158 contains, in addition to the conical member 156, three other members 164, 171 and 175 in which gas passages are provided. These are retained by means of a flanged cap nut 176 threaded onto the end of the body member 141. The member 164, which is seated against the flange 163 of the member 156, is provided with an annular recess 165 and a central projecting portion 166 which define a passageway leading from the holes 161 into the space 159 within the conical member 156. A central passageway within the projection 166 leads from this space into an enlarged space 167 within the member 164. On the flange 163 a tongue 168 is provided which registers with a cooperating groove in the member 164 to insure perfect alignment between these parts.

The member or retainer 171, which seats against the member 164, is provided with a tapered passageway 172 registering with the space 167 of the member 164. A spiral member 173 is fitted in the space 172 to define a vortex chamber therethrough. The vortex chamber opens abruptly into another enlargement or space 174 which in turn leads into the delivery tube 59 which is threaded into the member 175.

In operation, oxygen is admitted under a low pressure to the connection 143, whence it is conducted through the duct 144 into the recess 145, and delivered through the ported baffle plug 147 into the passageway 146 within the body member 141. A combustible gas is admitted through the connection 151 and the space 152 to the tube 154 under a pressure preferably slightly higher than that of the oxygen. The combustible gas issues from the tube 154 through the space 160 in a thin diverging stream and enters the space 162 at a relatively high velocity, where it comes into contact with the oxygen and entrains the same. The resulting mixture of oxygen and combustible gas then flows down along the conical member and passes through the holes 161 into the curved passageway 165. This passageway directs the mixture into the space 159 where the gas streams converge and undergo a turbulence and reversal of flow to produce a further mixing of the gases. From this space the gases are conducted into the space 167 wherein the velocity is momentarily diminished before entering the spiral passageways of the vortex. The vortex chamber is tapered down to a small diameter at the downstream end, so that the velocity of the gas in passing therethrough is gradually increased. The gas, as it issues therefrom, has a considerable rotational, as well as forward velocity so that when it emerges suddenly into the enlargement 174 the stream tends to spread into a diverging and approximately conical jet which sets up a swirling motion of the gas to further the thorough intermingling of the oxygen and combustible. The gases, now intimately mixed, enter the delivery tube 59 to be conducted to the welding tip.

Figs. 10 to 15 illustrate welding tips in which a single gas mixture is separated into separate stream portions to provide flame regions having different characteristics by means of a separate group of ports for each flame region. The tip shown in Figs. 10 and 11 has a head portion 181 containing a recess 182 into which opens a plurality of passageways 183 for introducing converging jets therein. The passageways 183 lead from an interior chamber 184 and are of uniform bore. The recess 182 may or may not be of such dimensions as to introduce a turbulence in the gas stream. A plurality of passageways 185 communicate with the interior gas chamber 184 within the tip and open at the end of the tip in a series of ports surrounding the recess 182. The passageways 185 are preferably of smaller bore than the passageways 183 so that the gas in flowing therethrough encounters a considerably greater frictional resistance to its flow than does the gas in the ducts 183.

In operation the gas will issue from the tip through the converging passageways 183 and the shunting passageways 185 at velocities depending upon the relative resistance offered to the gas stream by the passageways themselves. Because of the higher resistance encountered in the passageways 185 the gas will issue therefrom at a much slower velocity than from the passageways 183. The several jets issuing from the ports 183 will converge to produce a central welding flame in the usual manner and may or may not have their outer portions disrupted to produce a protecting mantle of slow moving gas in the manner already referred to. The several slow moving streams issuing from the passageways 185 will combine to constitute a protecting sheath surrounding the central welding flame, or will augment any protecting sheath produced by the recess 182 acting upon the jets issuing from the ports 183.

Figs. 12 and 13 illustrate a similar tip. A plurality of converging passageways 191 leading from an inner space 192 open into a recess 193 for introducing gases to the welding zone. Additional passageways 194 of smaller bore open at the end of the tip in a series of orifices surrounding the recess 193 to introduce a slow moving projecting mantle of gas surrounding the welding flame in the manner described in connection with the Figs. 10 and 11. The gas passages 193, however, do not communicate directly with the space 192 within the body of the tip, but intersect the passageways 191 at the point 195 as shown in Fig. 75.

13. This arrangement provides a very short duct from the juncture 195, through the passageway 191 to the opening or recess 193, as compared with the lengths of the ducts 194 so that a larger bore may be employed for the ducts 194 than would be possible for the ducts 185 in Figure 11, while still maintaining a sufficient difference in frictional resistance to the flow of the gas in the ducts 191 and 194. This may often be quite desirable because large diameter holes may be drilled more easily than holes of a small diameter and, because openings at the end of the tips are often exposed to a spray of molten metal from the welding puddle, particles or drops of metal will not close large openings as easily as small ones.

While the passageways for introducing the slow moving gas to the mantle or protecting sheath have been shown in Figs. 11 and 13 as being parallel to the axis of the tips, it is obvious that they may be made either converging or diverging as the circumstances may require.

Figs. 14 and 15 illustrate welding tips in which the gas issues from an adjustable annular orifice to produce the protecting mantle surrounding the welding flame. Fig. 14 illustrates a welding tip 201 which is externally threaded to receive a sleeve member 202 and a lock nut 203. The forward end 204 of the sleeve 202 converges to lie substantially parallel to the surface of the tapered head 205 of the welding tip, and is spaced therefrom to provide an annular passageway 206 between the head 205 and the tapered portion 204 of the sleeve. A plurality of converging ports 211 communicate with an interior chamber 212 and open into a recess 213 in the end of the trip to introduce gas into the welding flame. Ports 214 communicate between the interior space 212 and the annular space or passageway 206 surrounding the tip. In operation the gas issues from the ports 211 into the recess 213 to provide a hot central welding flame. The gas also issues from the ports 214 into the annular space 206 surrounding the welding tip and will issue therefrom as a slow moving and slow burning mantle to protect the welding flame from atmospheric oxidation. The position of the sleeve 202 may be adjusted upon the tip by turning it on or off from the same to adjust the width of the tapered annular passageway 206, whereby to adjust the volume and velocity of the sheath of gas surrounding the welding zone. The lock nut 203 may be turned up tightly against the sleeve 202 to secure it in position. Like the ports 185 and 194 described above, the ports 214 in Figure 14 may be parallel to the axis of the tip if desired.

The welding tip of Figure 15 is identical with that of Figure 14 with the exception that instead of being provided with ports 214 leading directly from the space 212 to the annular duct 206, as in Figure 14, it has a series of short ducts 216 intersecting the ducts 211 at the point 217 and opening into the space 206.

In all of the welding tips of Figures 10 to 15 the recess in the end of the tip is not provided expressly for the separation of a protecting mantle from the welding flame itself, as is done in other tips disclosed herein, although such a segregation may incidentally take place. It may in some cases be desirable to dispense with the recess entirely and to have the ports which supply gas to the welding zone at the extreme end of the tip. The recess will, in many instances, be desirable since the walls of the recess itself will supplement the sheath of slow moving gas in shielding the welding flame from the atmosphere. It is also possible, and may be desirable in many cases, to provide the passages 183, 191 and 211 with flared outlet ports similar to those shown in Figures 1 to 6 inclusive.

While I have disclosed the preferred method of putting my invention into practice and have illustrated some specific embodiments of the same, it is to be understood that my invention is not to be limited to the specific means shown and described but that, in fact, widely different means may be employed in the practice of the broader aspects of my invention.

What I claim, therefore, and desire to secure by Letters Patent is:

1. In a device for welding steel and the like, a welding tip having a recess in the end thereof and a plurality of ducts opening into said recess, said ducts being disposed to emit a plurality of converging jets into said recess, each of said ducts being flared at its downstream orifice.

2. A welding torch comprising a ported gas receiving head having separated gas conduits therein, a body member having a central bore communicating with one of said gas conduits, a straight tube carried by said head and having its interior communicating with the other of said gas conduits, said tube being disposed coaxially within said central bore, a second bore within said body member, an apertured web disposed between said bores and having a central conical portion positioned closely adjacent to the discharge end of said tube to spread the gas issuing therefrom into a thin stream, means for converging and reversing the flow of said gas stream, means for imparting rotation to the gas stream, and means for holding said tube in axial position in said first central bore.

HAROLD H. LURIE.